Feb. 4, 1936. M. O. SQUIRES 2,029,682
DENTAL MANIKIN
Filed May 12, 1933 3 Sheets-Sheet 3

INVENTOR:
MARTIN O. SQUIRES.
BY
ATTORNEY.

Patented Feb. 4, 1936

2,029,682

UNITED STATES PATENT OFFICE 2,029,682

DENTAL MANIKIN

Martin O. Squires, San Francisco, Calif.

Application May 12, 1933, Serial No. 670,716

6 Claims. (Cl. 32—71)

This invention relates to dental manikins and more particularly to means for demonstrating artificial dentures.

The transition from natural teeth to artificial dentures is a trying ordeal for the patient. Being unskilled in dentistry, his misgivings make it difficult for the dentist to convince him of the possibilities of the substitution. Strangely enough, the majority of patients are more concerned about "sunken cheeks" than they are with the technical excellence of the dentures.

Without practical means of actually demonstrating the possibilities of molding facial contours by modified dentures, the dentist is at a great disadvantage and patients are prone to postpone the inevitable change to artificial dentures even at the risk of permanently impairing their health.

Among the objects of this invention are to provide means for mechanically demonstrating the possibilities of facial contour molding by the use of modified artificial dentures.

In this specification and the accompanying drawings, the invention is disclosed in its preferred form. However, it is to be understood that it is not limited to this form, because it may be embodied in other forms without departing from the spirit of the invention as defined in the claims following the description.

Figure 1:
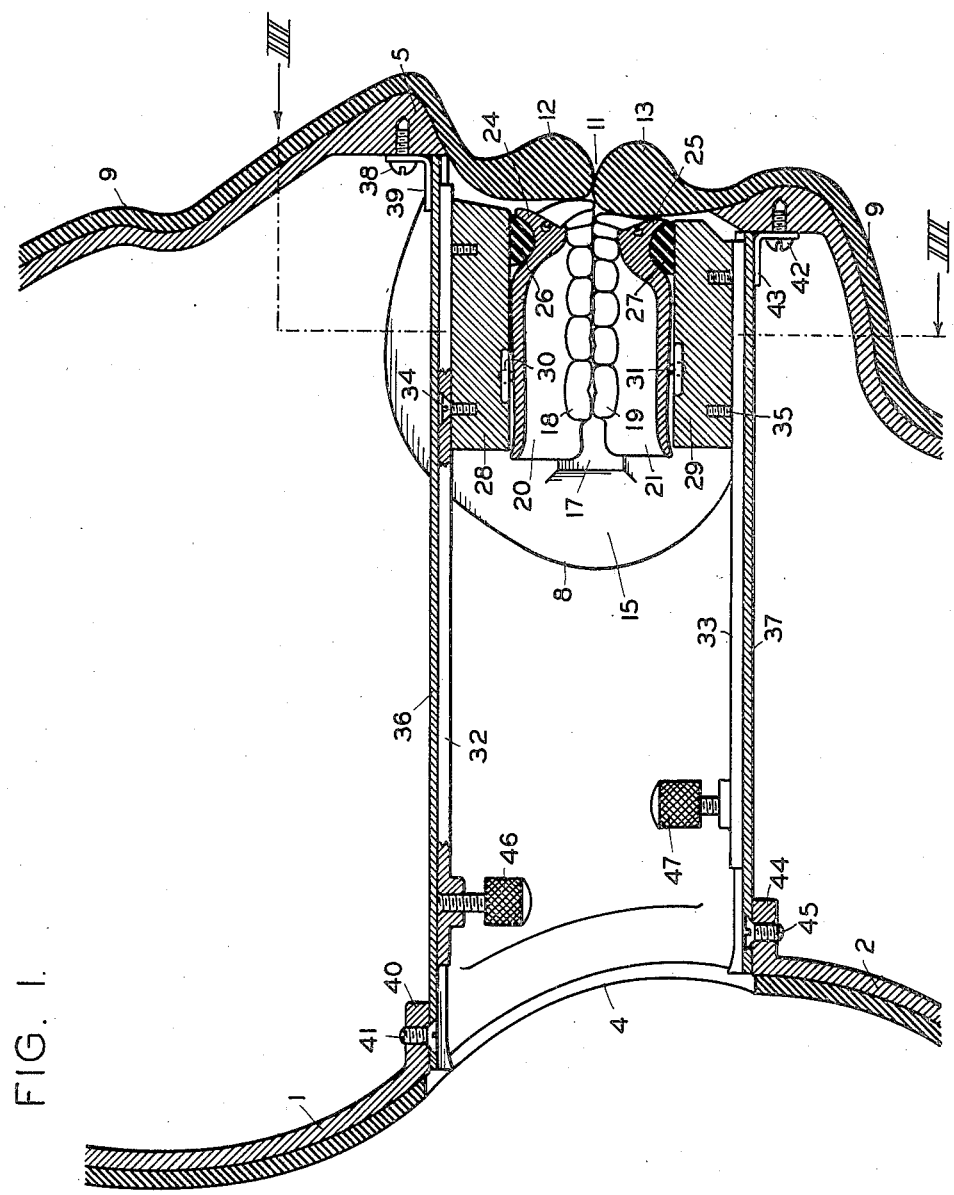
Fig. 1 is a vertical section taken on the line 1—1, Fig. 3, of a dental manikin constructed in accordance with this invention.

In detail, the construction illustrated in the drawings, referring to Fig. 1, comprises the simulation of a hollow human skull. This skull form is preferably cast in aluminum or any of the commercial vulcanizable compositions with the necessary strength and lightness. The form includes the neck 2 and the shoulder portion 3 forming a base upon which the manikin will firmly rest upon a table or pedestal.

The form 1 has an opening 4 at the rear and a front opening between the nose 5 and chin 6 with the lateral extensions 7 and 8 of the opening corresponding to the cheek areas from the cheek bones above to the jaw bones below and to the rear.

The skull form 1 is wholly or partially enclosed within the "skin" or cover 9 of elastic material, such as a suitable caoutchouc or rubber composition, simulating the human skin and underlying tissues. This skin may be tinted and otherwise treated to enhance the illusion.

The skin has the mouth opening 11 with the thickened upper and lower lips 12 and 13. The skin portions 14 and 15 over the cheek openings are thickened to about equal the normal thickness of the human cheeks, see Fig. 3. The mouth and cheeks are to simulate the mobile portions of the human face. In horizontal alinement with the mouth 11, the cheek portions are further thickened to form the arcuate lugs 16 and 17 adapted to lie against the upper and lower dentures.

Figure 3:
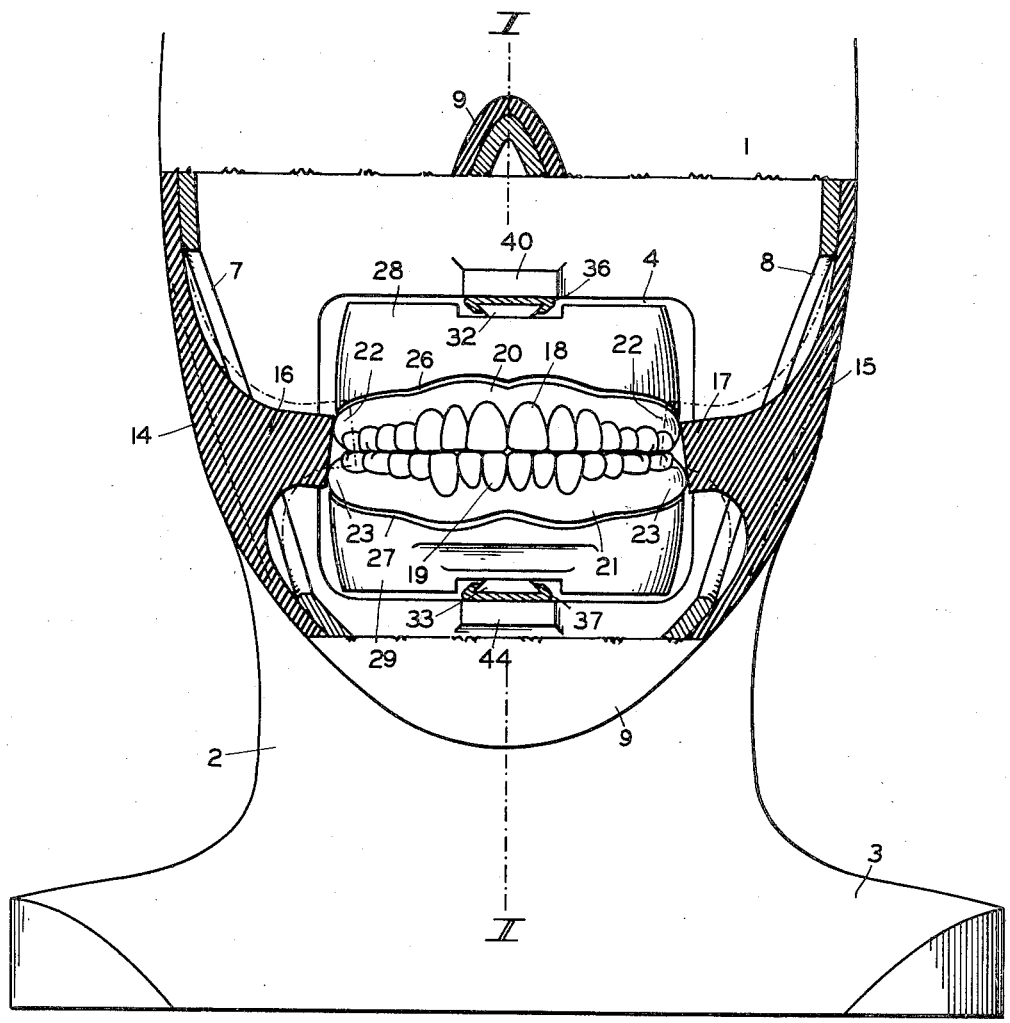
Fig. 3 is a front view, similar to Fig. 1, and taken on the line III—III in that figure, with the upper and lower dentures and their mountings shown in full lines.

The dentures comprise the usual artificial teeth 18 and 19 vulcanized or fixed in the gum plates 20 and 21 respectively, in the conventional manner. They may have the modifying protuberances 22 and 22 and 23 and 23 thereon to displace the lugs 16 and 17 to accomplish the desired cheek contours. These protuberances can be made detachable for substitutions to increase or decrease the distortion. As shown in Fig. 3, the protuberances 23 and 23 are the more prominent and tilt the inner planes of the lugs 16—17 outward at the bottom which accentuates the breadth of the jaws. If the protuberances 22 and 22 were the more prominent, the upper cheeks would be accentuated.

The primary object of the invention is to demonstrate that the artificial dentures replace within the oral cavity the equivalent of all the extracted teeth and gum shrinkage and as much more as the patient desires.

Normally, the human cheeks, as at 14—15, hang curtain-like from the cheek bones to the lower jaw and do not contact the teeth. In the manikin, the upper and lower jaw bones and incidental muscular tissues are not simulated because it is simpler to standardize the technique of demonstration by means of the lugs 16 and 17 and protuberances 23 and 23. The patient's fears are more easily allayed in the demonstrating if he sees only the plates 20 and 21 which are the only artificial denture added to his natural equipment in substituting the artificial teeth. It is desired to make one conventional manikin serve to demonstrate various types of human countenances as well as many types of dentures since only the cheeks and lips are involved. The protuberances 24—25 can be formed to advance or retract the upper and lower lips 12—13 to change the expression of the mouth. The lips can be rolled back by the fingers of the operator lifting on the upper cheek portions to disclose the dentures in simulation of a smile.

The technique of artificial dentures has many possibilities, the radius of the alveolar arches can be lengthened or shortened; malocclusions in nature can be corrected in the dentures and a new "bite" arranged in the substitute dentures. The scope of the art makes it possible to modify facial contours and expressions. These possibilities can be demonstrated with the manikin by inserting suitable dentures 20—21.

The manikin includes varied sets of these dentures formed to fit a standard mounting. The dentures have the usual sockets to fit the "gum" ridges 26—27, consisting of soft rubber attached to the vulcanite blocks or denture mountings 28—29 respectively. The dentures are detachably attached to these blocks by the friction snaps 30—31 to facilitate substitution.

The blocks 28—29 are fastened to their respective dovetail slides 32—33 by the counter-sunk screws 34—35. These slides are guided in the dovetail guides 36—37 respectively, see Figs. 1-3.

The guide 36 has its front end fixed to the inner surface of the nose 5 by the screw and bracket 38—39. The rear end is fixed to the bracket 40 on the form 1 by the screw 41. The forward and rear ends of the lower guide 37 are similarly fixed to the form at 42—43 and 44—45.

The slides are manipulated by means of the knurled set screws 46—47, having stems threaded in the slides 32—33 respectively and riveted to prevent the withdrawal of the stems. When the set screws are screwed inward, they bind against their respective guides to hold the slides as adjusted.

Figure 2:
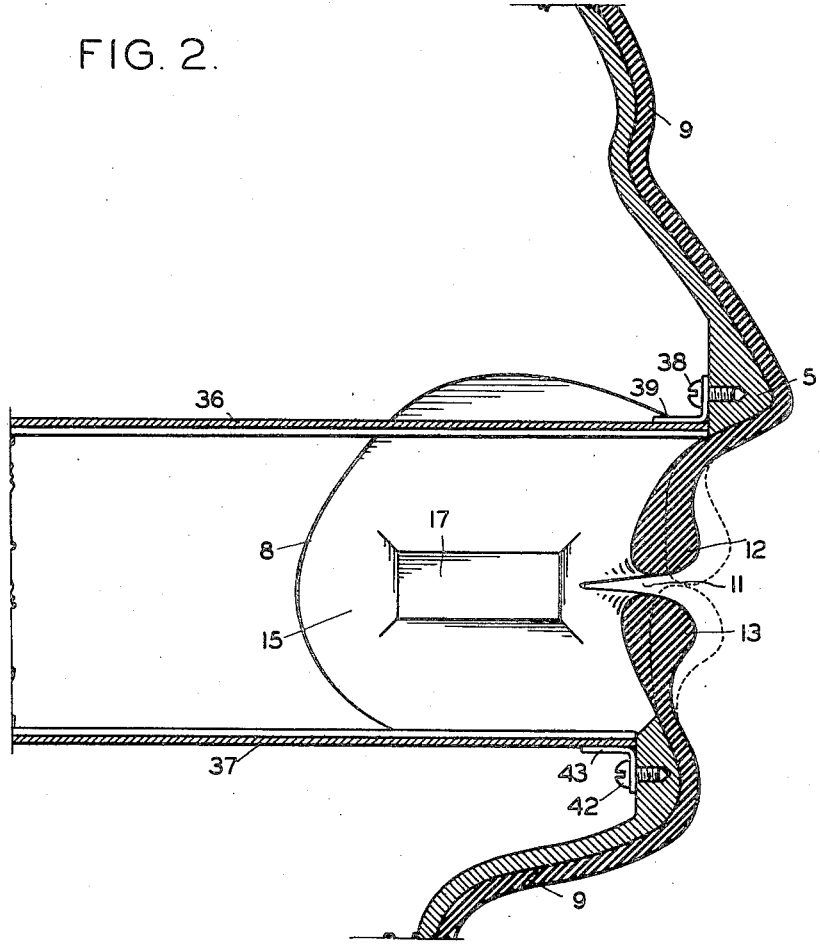
Fig. 2 is a similar view in fragmentary detail of the same with the dentures removed.

This invention is operated substantially as follows, referring to Fig. 2:

With the dentures removed, the lips 12—13 and the cheeks 14—15 normally sink inward. The desired denture 20 is snapped onto the block 28 at 30 and the slide 32 pushed into the guide 36. The denture 21 is then snapped onto the block 29 and the slide 33 is entered into the guide 37. The slides are manipulated by the hand of the operator until the dentures are in proper occlusion aided by the soft "gums" 26—27. The slides 32—33 are then moved forward or backward until the cheeks 14—15 and the lips 12—13 are displaced by the protuberances 22 to 25 to accomplish the desired contour of the elastic parts of the manikin, as in Figs. 1-3.

Obviously other portions of the human anatomy could be similarly simulated, for instance an elastic abdominal portion could be used to demonstrate hernia trusses, surgical bandages, corsets and the like, without departing from the spirit of the invention.

Having thus described this invention, what is claimed and desired to secure by Letters Patent is:

1. A hollow dental manikin having elastic portions simulating the mobile mouth and cheek area of the human face; dentures insertable in the manikin; internal lugs on the cheek portions of the face adapted to be distended by the insertion of said dentures.

2. A hollow dental manikin having elastic portions simulating the mobile mouth area of the human face; denture mountings insertable in said manikin; dentures on said mountings and having protuberances thereon; and internal lugs on the cheek portions of said face cooperating with said denture protuberances and adapted to be distended by the insertion thereof.

3. A hollow dental manikin having elastic portions simulating the mobile mouth area of the human face; denture mountings insertable in said manikin and having resilient "gum" ridges thereon; dentures having plates registering with said ridges and detachably engaging said mountings; said elastic portions being adapted to be distended and held distended by the insertion of said dentures.

4. A hollow dental manikin having elastic portions; denture mountings removably mounted in said manikin and having yielding "gum" ridges thereon; and means on said mountings for engaging conventional artificial denture plates; said elastic portions being adapted to be continuously distended by the insertion of said denture plates.

5. A dental manikin comprising a hollow form simulating the human head with an opening at area corresponding to the mobile mouth and cheek area of the face; an elastic cover enclosing said form; mountings in said form; insertable dentures engaging said mountings; and internal lugs on said elastic cover at the cheek area and adapted to be pushed outward and held outward by the insertion of said dentures.

6. A hollow dental manikin having elastic portions simulating the human face and having an opening at the back thereof; guides within said manikin; insertable blocks movable on said guides; and dentures detachably attached to said blocks; said elastic portion being adapted to be distended and held distended by the insertion of said dentures.

MARTIN O. SQUIRES.